(12) United States Patent
Wendorff

(10) Patent No.: US 7,349,511 B2
(45) Date of Patent: Mar. 25, 2008

(54) SYNCHRONOUS NETWORK

(75) Inventor: Wiland Von Wendorff, München (DE)

(73) Assignee: Infineon Technologies AG, Munich (DE)

( * ) Notice: Subject to any disclaimer, the term of this patent is extended or adjusted under 35 U.S.C. 154(b) by 1176 days.

(21) Appl. No.: 09/897,279

(22) Filed: Jul. 2, 2001

(65) Prior Publication Data
US 2002/0003848 A1    Jan. 10, 2002

(30) Foreign Application Priority Data
Jun. 30, 2000    (DE) ............................... 100 30 993

(51) Int. Cl.
*H04L 7/00*    (2006.01)

(52) U.S. Cl. .................................... 375/356

(58) Field of Classification Search ............... 375/354, 375/356, 357, 361, 365; 370/235, 280, 503, 370/509, 520
See application file for complete search history.

(56) References Cited

U.S. PATENT DOCUMENTS

| | | | | |
|---|---|---|---|---|
| 4,015,252 A | * | 3/1977 | Symanski | 341/100 |
| 4,054,753 A | * | 10/1977 | Kaul et al. | 370/324 |
| 4,963,868 A | * | 10/1990 | Takayama et al. | 341/72 |
| 5,206,881 A | * | 4/1993 | Messenger et al. | 375/145 |
| 5,463,646 A | * | 10/1995 | Dillon et al. | 714/822 |
| 5,576,702 A | * | 11/1996 | Samoylenko | 340/825.5 |
| 5,673,252 A | * | 9/1997 | Johnson et al. | 370/449 |
| 5,706,278 A | * | 1/1998 | Robillard et al. | 370/222 |
| 5,774,658 A | | 6/1998 | Kalkunte et al. | |
| 5,923,902 A | | 7/1999 | Inagaki | |
| 5,943,322 A | | 8/1999 | Mayor et al. | 370/280 |
| 6,028,853 A | * | 2/2000 | Haartsen | 370/338 |
| 6,128,282 A | * | 10/2000 | Liebetreu et al. | 370/235 |
| 6,594,273 B1 | * | 7/2003 | McGibney | 370/442 |
| 6,804,209 B1 | * | 10/2004 | Sugaya et al. | 370/328 |

FOREIGN PATENT DOCUMENTS

DE    197 52 697 A1    6/1999

OTHER PUBLICATIONS

User's Manual for DSP 56303, issued by Motorola Inc. in 1996, pp. 7-1 to 7-29.
Tanenbaum, Andrew S.: "Computer Networks", Prentice-Hall Inc., 3rd ed., Upper Saddle River, N. J.: 1996, pp. 243-271.
Manchester, Doug: "Recovering the Clock Pulse from NRZ-inverted Data", Electronics, dated Jun. 30, 1982, p. 135.

* cited by examiner

*Primary Examiner*—Kevin Kim
(74) *Attorney, Agent, or Firm*—Laurence A. Greenberg; Werner H. Stemer; Ralph E. Locher

(57) ABSTRACT

A synchronous network having a multiplicity of nodes which can transmit data to one another in a predefined sequence for a predefined duration is described. The described network is distinguished by the fact that a plurality of nodes, or all the nodes, can output a synchronization signal which defines a reference time for the synchronization of the nodes.

8 Claims, 2 Drawing Sheets

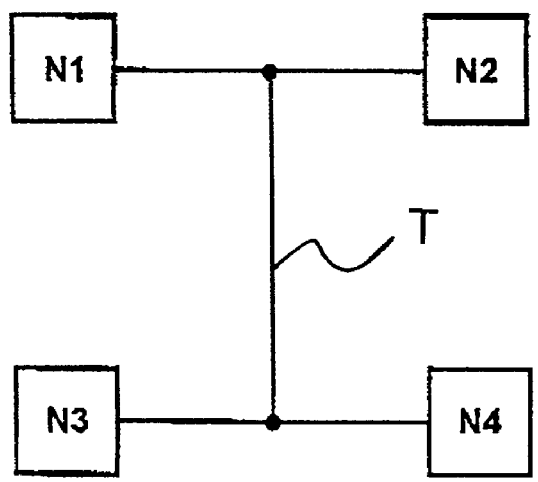

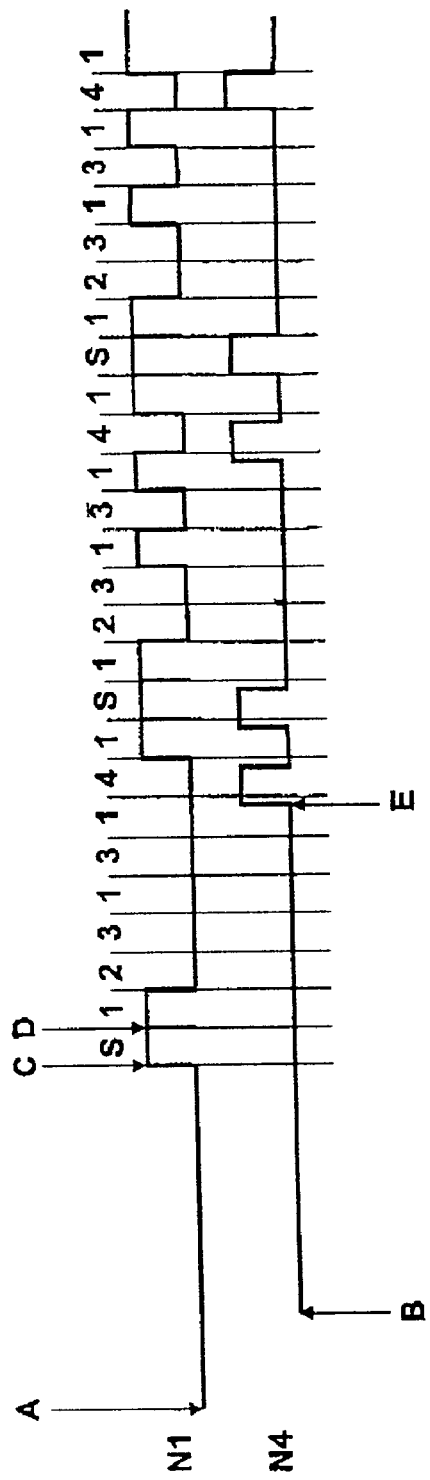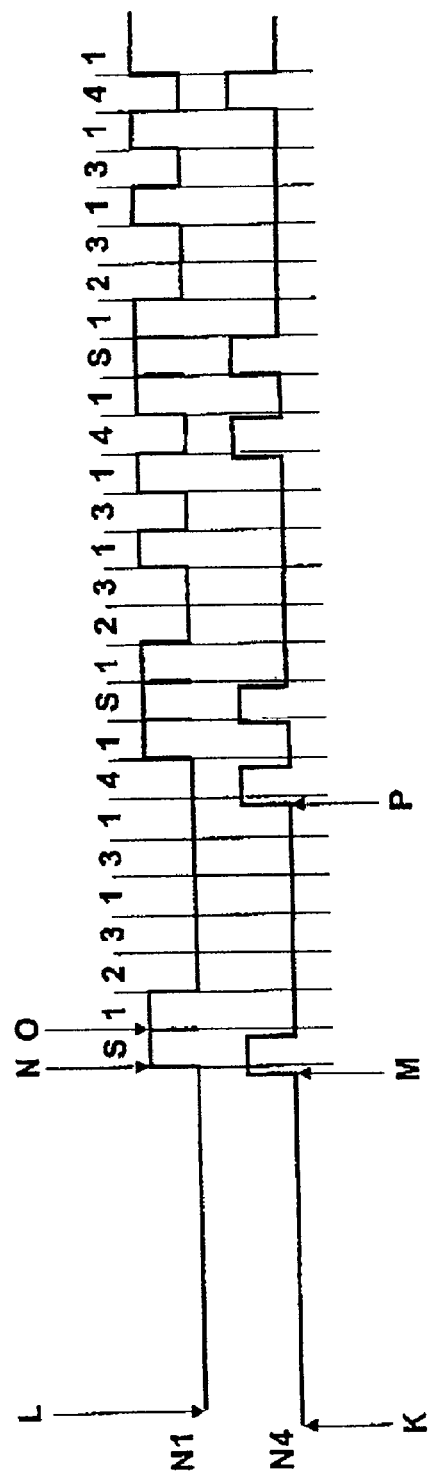

SYNCHRONOUS NETWORK

BACKGROUND OF THE INVENTION

Field of the Invention

The present invention relates to a synchronous network having a multiplicity of nodes that can transmit data to one another in a predefined sequence for a predefined duration.

Such a network is, for example, a network that operates according to what is referred to as the time division multiple access (TDMA) method.

A known network contains four units which are referred to below as nodes, and a transmission link which connects the nodes and via which data which is to be transmitted between the nodes can be transmitted.

For the sake of completeness, it is to be noted that the number of nodes is not restricted to four; it may be any desired larger or smaller number.

It is also to be noted that the transmission link may be of any desired configuration. It may be an electrical line that is used to transmit electrical signals, an optical waveguide that is used to transmit optical signals, a transmission channel which permits data to be transmitted in a wirefree fashion, or some other transmission link.

The nodes contain definitions of the sequence in which the respective nodes are allowed to transmit, and a width of the time slot during which they are allowed to transmit data.

A known problem in systems of this type consists in the fact that the nodes have to be synchronized after starting up, after faults, after changes of operating mode etc., and that it is necessary to ensure that they remain synchronized. Otherwise, the nodes may not transmit data precisely, or not at all, in the time slots reserved for them, and this may lead to a situation in which data originating from different nodes on the transmission link is superposed or overlaps and as a result becomes unusable.

The nodes are generally synchronized in accordance with one of the two methods described below.

A first synchronization method is defined by a reference clock being fed by one of the nodes to the other nodes, and that, by referring to the reference clock, the other nodes synchronize themselves with the node which transmits the reference clock. The method has the disadvantage that if the node that transmits the reference clock fails, the entire system fails.

A second possibility is that the nodes synchronize themselves by referring to a start and/or an end time and/or the duration of the transmission of data from one node to another node. The method has the disadvantage that after the system is started up it takes an indeterminately long time until the nodes are synchronized. The method of synchronization can in fact not take place until after a node has been able to transmit data without another node simultaneously transmitting data, and this is sometimes an awkward condition before the synchronization, that is to say at a time at which it has not yet been defined at what time which node is allowed to transmit.

SUMMARY OF THE INVENTION

It is accordingly an object of the invention to provide a synchronous network that overcomes the above-mentioned disadvantages of the prior art devices of this general type, in which the nodes of the network can be synchronized quickly and easily under all circumstances.

With the foregoing and other objects in view there is provided, in accordance with the invention, a synchronous network containing nodes transmitting data to one another in a predefined sequence for a predefined duration. A plurality of the nodes output a synchronization signal defining a reference time for a synchronization of the nodes.

According to the invention, the network is defined by the fact that a plurality of nodes, or all the nodes, can output a synchronization signal that defines a reference time for the synchronization of the nodes.

This proves advantageous in two ways. First, the plurality of nodes, or all the nodes, can predefine a reference time to which synchronization is to take place. Second, the synchronization signal that specifies the reference time does not need to contain any information relating to the transmitting party, or any other information, so that the synchronization signal can be such that it does not disrupt the synchronization if the synchronization signals of a plurality of nodes overlap one another chronologically.

As a result, it is possible to synchronize the nodes quickly and easily under all circumstances.

In accordance with an added mode of the invention, the synchronization signal has at least one of a time profile and a duration that the synchronization signal can be identified as the synchronization signal even if other synchronization signals which are output by different ones of the nodes are overlapping on one another.

In accordance with an additional feature of the invention, the synchronization signal is encoded using an NRZ code, a XERXES code, or a Manchester code.

In accordance with another feature of the invention, the synchronization signal has a duration that is longer than a maximum signal transit time occurring inside the network.

In accordance with a further feature of the invention, a respective node of the nodes which wishes to synchronize with one or more others of the nodes initially observes for a predetermined time to determine whether another one of the nodes is outputting the synchronization signal or other data, and the respective node outputs the synchronization signal if this is not the case.

In accordance with another added feature of the invention, the respective node wishing to synchronize with one or more others of the nodes outputs the synchronization signal during a synchronization phase only if the respective node has detected that no other one of the nodes is outputting the synchronization signal or the other data.

In accordance with another additional feature of the invention, the respective node wishing to synchronize with one or more others of the nodes outputs further data which identifies the respective node in a time slot assigned to the respective node after outputting the synchronization signal or receiving the synchronization signal from another one of the nodes.

In accordance with a further added feature of the invention, the synchronization signal is output in a specific time slot of a time slot cycle used.

In accordance with a further additional feature of the invention, the specific time slot is a global time slot in which all of the nodes are allowed to output specific signals and specific data.

In accordance with another feature of the invention, all of the nodes output the synchronization signal.

In accordance with a concomitant feature of the invention, the respective node wishing to synchronize with one or more others of the nodes defines a chronological position of time slots assigned to it as a function of the synchronization signal which is output by the respective node or received by the respective node from another one of the nodes and as a function of received data which others of the nodes have output in their assigned time slots, in order to identify itself to others of the nodes.

Other features which are considered as characteristic for the invention are set forth in the appended claims.

Although the invention is illustrated and described herein as embodied in a synchronous network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is an illustration of an assignment of time slots of a time slot cycle to individual nodes of a network which is performed in a network according to the invention;

FIG. 2 is a timing diagram showing a synchronization of two nodes of the network;

FIG. 3 is a timing diagram showing the synchronization of two nodes of the network;

FIG. 4 is a block diagram of a structure of a network which operates according to the TDMA method; and FIG. 5 is an illustration of the assignment of the time slots of the time slot cycle to the individual nodes of the network which is performed in the network described at the beginning with reference to FIG. 4.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 4 thereof, there is shown a network which contains four units N1 to N4 which are referred to below as nodes, and a transmission link T which connects the nodes and via which data which is to be transmitted between the nodes N1 to N4 can be transmitted. For the sake of completeness, it is to be noted that the number of nodes is not restricted to four; it may be any desired larger or smaller number.

It is also to be noted that the transmission link T may be of any desired configuration. It may be an electrical line that is used to transmit electrical signals, an optical waveguide that is used to transmit optical signals, a transmission channel which permits data to be transmitted in a wirefree fashion, or some other transmission link.

The nodes N1 to N4 contain definitions of the sequence in which the respective nodes are allowed to transmit, and the width of the time slot during which they are allowed to transmit data.

In the example in question it is assumed that a first time slot is reserved for the transmission of data by the first node N1, a second time slot is reserved for the transmission of data by the second node N2, a third time slot is reserved for the transmission of data by the third node N3, a fourth time slot is reserved for the transmission of data by the first node N1, a fifth time slot is reserved for the transmission of data by the third node N3, a sixth time slot is reserved for the transmission of data by the first node N1, a seventh time slot is reserved for the transmission of data by the fourth node N4, an eighth time slot is reserved for the transmission of data by the first node N1, and that the time slot sequence which is referred to as a cycle can be adjoined by one or more further such cycles, with or without a time interval.

Such a cycle is illustrated in FIG. 5; the numbers given in the time slots refer to the number of the node for which the respective time slots are determined.

For the sake of completeness it is to be noted that the length of the individual time slots can be of any desired size independently of one another, and that pauses may be provided between the time slots.

A known problem in systems of this type consists in the fact that the nodes N1 to N4 have to be synchronized after starting up, after faults, after changes of operating mode etc., and that it is necessary to ensure that they remain synchronized. Otherwise, the nodes may not transmit data precisely, or not at all, in the time slots reserved for them, and this may lead to a situation in which data originating from different nodes on the transmission link T is superposed or overlaps and as a result becomes unusable.

The nodes are generally synchronized in accordance with one of the two methods described below.

The first method consists in a reference clock being fed by one of the nodes to the other nodes, and that, by referring to the reference clock, the other nodes synchronize themselves with the node which transmits the reference clock. The method has the disadvantage that if the node that transmits the reference clock fails, the entire system fails.

The second possibility is that the nodes synchronize themselves by referring to a start and/or an end time and/or the duration of the transmission of data from one node to another node. The method has the disadvantage that after the system is started up it takes an indeterminately long time until the nodes are synchronized. The method of synchronization can in fact not take place until after a node has been able to transmit data without another node simultaneously transmitting data. This is sometimes an awkward condition before the synchronization, that is to say at a time at which it has not yet been defined at what time which node is allowed to transmit.

According to the invention of the instant application, the structure and the operation of the nodes must be modified to overcome the above mentioned problems.

One of the peculiarities of the system of the invention is the fact that a plurality of nodes, or all the nodes, can output a synchronization signal that defines a reference time for the synchronization of the nodes.

This permits fast and reliable synchronization of the nodes under all circumstances.

A further peculiarity of the system of the invention is that the time slot cycle which is used has an additional time slot which is referred to below as a global time slot and in which any desired nodes can transmit any desired data.

Such a time slot cycle is illustrated in FIG. 1. A global time slot is referred to by the reference symbol S. For the sake of completeness, it is to be noted that the number of time slots which form a time slot cycle, their length, and the nodes for which they are reserved, can also be defined in any other desired way independently of one another.

In the global time slot S, and in the other time slots referred to below as private time slots, the nodes can in principle transmit any desired data.

In the example in question, the data transmitted in the private time slots contains at least information on the node that has output the respective data.

After a node is synchronized with one or more other nodes, the respective node transmits data in all the private time slots assigned to it. This applies even if the respective node does not have any (user) data to transmit. In this case, the transmitted data contain both the information on the party transmitting the data and preferably also information indicating that no user data are being transmitted.

Transmitted data that does not contain any user data is referred to below as zero data.

In the example in question, the nodes of the system are synchronized as now described.

If a node wishes to synchronize itself with one or more other nodes (after starting up, after a change of operating mode, after a fault or after other events), it first observes for a predefined time to determine whether one or more other nodes have already transmitted a synchronization signal or data. The predetermined time corresponds in the example in question to the duration of a time slot cycle plus the maximum signal transit time that can occur in the system.

If neither a synchronization signal nor other data are transmitted in this time period the respective node outputs a synchronization signal. The node defines internally that the starting time of the outputting of the synchronization signal is the start of the global time slot S. The node outputs data in a private time slot (preferably in the next time slot) which is assigned to it, by which data it identifies itself to other nodes.

The outputting of the synchronization signal and of the data that identifies the node is repeated in the subsequent time slot cycles. That is to say the node outputs a synchronization signal in each global time slot S, and outputs data which identifies it in the respective one (preferably in the first) of the private time slots assigned to it of each time slot cycle.

The fact that the node outputs data only in a single private time slot per time slot cycle in this phase (in the synchronization phase) irrespective of the number of private time slots which are assigned to it per time slot cycle, has the positive effect that the node (not yet synchronized) cannot disrupt, or can only disrupt to a small extent, a data exchange which is already taking place between other nodes (already synchronized or in the process of synchronizing). This is significant if, owing to a fault, the node has not detected, or has not been able to detect, that other nodes are already transmitting data and/or signals.

If a node which wishes to synchronize with another node or with a plurality of other nodes detects, during the checking as to whether one or more other nodes are already transmitting a synchronization signal or data, that this is the case, it does not output its own synchronization signal, but rather, by referring to the received synchronization signal and/or the received data, synchronizes itself with the node which is outputting the synchronization signal and/or the data, and then outputs data which identifies it in a private time slot assigned to it (preferably already in the next private time slot assigned to it). This data may be zero data or already contain user data.

The other node (which outputs the synchronization signal) detects from the fact that another node is outputting data which identifies it, that synchronization with the other node has taken place, and it subsequently switches from the synchronization operating mode into the normal operating mode in which it no longer can only transmit zero data but can also transmit data containing user data. In addition, the first node can then also set the outputting of synchronization signals. This proves advantageous because the global time slot S can then be used for other purposes. However, the outputting of the synchronization signals can also be continued. This provides the possibility that the system can also contain nodes that require an external reference clock for synchronization and/or for maintaining the synchronization. If the synchronization signals are output even after synchronization has taken place, it is possible to provide that not only one node but also a plurality of nodes, or all the nodes, which are already synchronized output synchronization signals. As a result, it is possible to avoid a situation in which nodes that are dependent on receiving synchronization signals automatically fail if the node that outputs the synchronization signals fails.

If one or more further nodes wish to synchronize themselves according to this, the same procedures essentially occur as in the case of the node synchronization described above.

The synchronization of two nodes as described above, to be more precise of the nodes N1 and N4, is illustrated in FIG. 2.

In the example in question, of the two nodes N1 and N4, the node N1 goes into the ready-to-use state first. The time at which this is the case is designated in FIG. 2 by the reference symbol A.

The first node N1 then first observes a predetermined time (a time corresponding to the duration of a time slot cycle plus the maximum signal transit time inside the system) to determine whether one of the other nodes is already transmitting data and/or signals over the transmission link T.

Because this is not the case in the example in question, it outputs a synchronization signal at the time designated by C in FIG. 2, and defines internally that the time C is the start of the global time slot S, and it outputs zero data in the next private time slot assigned to it, that is to say at a time designated by D in FIG. 2.

A short time after the ready-to-use state for the first node N1 has been reached, the node N4 is ready to use. The time at which this is the case is designated by the reference symbol B in FIG. 2.

The node N4 first observes for a predetermined time (a time corresponding to the duration of a time slot cycle plus the maximum signal transit time within the system) to determine whether another node is already transmitting data and/or signals over the transmission link T.

The node N4 determines here that the first node N1 outputs a synchronization signal and zero data inside this time period. The node N4 synchronizes itself by referring to this synchronization signal and to this data, and outputs data in the next private time slot assigned to it. The time at which this is the case is designated by the reference symbol E in FIG. 2. The data that is output by the node N4 may be zero data or already contain user data.

The first node N1 detects from this that synchronization with the node N4 has taken place, and it subsequently switches over from the synchronization operating mode into a normal operating mode in which it outputs data in each time slot assigned to it, and can no longer transmit only zero data but can also transmit data containing user data. The node N4 also outputs data starting from the time E in all the time slots assigned to it, this data also being able to be data items which contain zero data or user data independently of one another.

As is clear from FIG. 2, the node N4 is not yet precisely synchronized with the first node N1 at the time E; the data which is output by the node N4 is output slightly too early. However, this is corrected in the following time slot cycles; all the nodes which are already synchronized carry out resynchronization at longer or shorter intervals (for example once per time slot cycle) by referring to the synchronization signals and/or data items which are output by the other nodes. As is clear from FIG. 2, the node N4 is as a result synchronized precisely with the first node N1 inside a very short time (within 1 to 2 time slot cycles).

FIG. 3 illustrates the situation in which the first node N1 and the node N4 become ready for use virtually simultaneously and attempt to synchronize themselves with other nodes.

In this example, of the two nodes N1 and N4, the node N4 goes into the ready-to-use state first. The time at which this is the case is designated by the reference symbol K in FIG. 3.

The node N4 first observes for a predetermined time (a time corresponding to the duration of a time slot cycle plus the maximum signal transit time inside the system) to determine whether another node is already transmitting data and/or signals over the transmission link T.

Because this is not the case in the example in question, at a time designated by M in FIG. 3, the node N4 outputs a synchronization signal and defines internally that the time M is the start of the global time slot S.

A very short time after the node N4 has become ready to use, the other node N1 also goes into the ready-to-use state. The time at which this is the case is designated by the reference symbol L in FIG. 3.

The node N1 first observes for a predetermined time (a time corresponding to the duration of a time slot cycle plus the maximum signal transit time inside the system) to determine whether another node is already transmitting data and/or signals over the transmission link T.

The node N1 determines here that this is not the case. The fact that the node N4 has already started to output a synchronization signal within this time period is not registered by the node N1 because the transmission of the synchronization signal does not start until just before the end of the observation time period.

For this reason, the node N1 outputs a synchronization signal at a time designated by the reference symbol N in FIG. 3.

Because the synchronization signals of the nodes N1 and N4 are output almost simultaneously, the nodes N1 and N4 do not notice that not only the respective node itself but also the respective other node has output a synchronization signal. Both nodes therefore wait for the start of a private time slot assigned to them before outputting zero data.

The first private time slot that is assigned to one of the two nodes N1 and N4 is a time slot assigned to the node N1. The time at which this is the case is designated by the reference symbol O in the FIG. 3. In this time slot, the node N1 outputs zero data.

The other node N4 registers this and detects from it that the node N1 must have output a synchronization signal in synchronism with it. The node N4 synchronizes itself with the node N1 and from then on outputs data in all the private time slots assigned to it, the data being able to be zero data or data containing user data. The first private time slot in which the node N4 outputs data starts at a time designated by the reference symbol P in FIG. 3.

From the fact that the node N4 is outputting data, the other node N1 detects that synchronization with the node N4 has taken place. For this reason, the node N1 changes from the synchronization operating mode into the normal operating mode and from then on outputs data in each private time slot assigned to it, this data being able to be zero data or data containing user data.

In the same way as in the example that is shown in FIG. 2 and described with reference thereto, the node N4 is first not yet synchronized precisely with the first node N1. The data which is output by the node N4 at the time P is output slightly too early. However, this is corrected in the following time slot cycles as in the example illustrated in FIG. 2.

In the examples in question, synchronization signals continue to be output by the nodes even after their synchronization. They are output in each case in the global time slot S. As has already been mentioned above, it is also possible to dispense with this. The global time slots S can then also be used in some other way, for example in order to confirm or repeat or enable the execution of specific commands which are transmitted to a node in a private time slot from another node (for example of the order to activate an airbag). To cause nodes to change their operating mode, and/or to transmit network states, for example alarm states in what is referred to as the byte flight protocol.

If no further synchronization signals are transmitted after two or more nodes have been synchronized, synchronization signals that are nevertheless transmitted (owing to a fault in a node and/or on the transmission link) are ignored by the already synchronized nodes. In addition, it proves advantageous that a node which repeatedly outputs synchronization signals in order to carry out a synchronization stops outputting the synchronization signals after a predetermined time or after outputting a certain number of synchronization signals. As a result of this it is possible to ensure that such a node does not disrupt, or only disrupts briefly, the data exchange between the other nodes.

If no further synchronization signals are transmitted after two or more nodes have been synchronized, it proves advantageous if the other signals or data items which are transmitted in the global time slots S have a different chronological profile and/or a different duration than the synchronization signals.

The synchronization signals are structured such that they define a reference time. In the example in question, the start of the global time slot S is defined by the synchronization signals; of course, the synchronization signals can, however, also define any desired other times within a time slot cycle.

The synchronization signals have a chronological profile and/or a duration such that they can be detected without doubt as synchronization signals by the receivers even if the synchronization signals of a plurality of nodes are superimposed on one another or overlap. This is ensured in the example in question by virtue of the fact that they are encoded using an NRZ code, that is to say they have a predetermined level for a predetermined duration. As an alternative, it is possible to provide for them to be encoded using the MFM code, the XERXES code, the Manchester code or the like.

The duration of the synchronization signals is defined such that it is significantly longer than the maximum signal transit time that can occur in the system. As a result it is possible to prevent a situation in which a second node starts to output a synchronization signal after a first node has finished outputting a synchronization signal. Such synchronization signals that are output in succession and are not superposed on one another and do not overlap could disrupt the synchronization. It is not necessary to prevent synchronization signals being output completely simultaneously or almost simultaneously by different nodes; such synchronization signals are superposed on one another or overlap and do not disrupt the synchronization as has been described above with reference to FIG. 3.

However, on the other hand, the duration of the synchronization signals should not be too long either. As a result of this it is possible to ensure that synchronization signals which are output incorrectly by a node which is not operating properly do not disrupt the operation of the other nodes any more than is absolutely necessary.

If the transmission link is an electrical conductor with a length of approximately 40 m, the length of the synchronization signals is approximately 2 to 3 ms.

It is apparent that the structure of the system and the nodes as well as the synchronization and the operation of the nodes can be modified in many ways.

For example, there is no need for the global time slot S to be the first time slot of a time slot cycle.

Furthermore, the use of the method described is also not restricted to networks that operate according to the TDMA method. The method can, for example, also be applied when bit map protocols are used. The private time slots to which the global time slot that is reserved for the transmission of synchronization signals during the synchronization phase is added would be what are referred to as contention slots in this case.

The network described makes it possible, irrespective of the details of the way in which it is implemented in practice, to perform fast and easy synchronization of nodes which are to be synchronized with one another.

I claim:

1. A synchronous network, comprising:
    nodes transmitting data to one another in a predefined sequence for a predefined duration, a plurality of said nodes outputting a synchronization signal defining a reference time for a synchronization of said nodes, said synchronization signal having a duration which is longer than a maximum signal transit time occurring inside the network;
    a respective node of said nodes wishing to synchronize with one or more others of said nodes outputting the synchronization signal and further data which identifies said respective node in a time slot assigned to said respective node after outputting the synchronization signal or receiving the synchronization signal from another one of said nodes; and
    said synchronization signal having at least one of a time profile and a duration that the synchronization signal can be identified as the synchronization signal even if other synchronization signals which are output by different ones of said nodes are overlapping on one another.

2. The network according to claim 1, wherein the synchronization signal is encoded using one of an NRZ code, a XERXES code, and a Manchester code.

3. A synchronous network, comprising:
    nodes transmitting data to one another in a predefined sequence for a predefined duration, a plurality of said nodes outputting a synchronization signal defining a reference time for a synchronization of said nodes, said synchronization signal having a duration which is longer than a maximum signal transit time occurring inside the network, wherein a respective node of said nodes wishing to synchronize with one or more others of said nodes initially observes for a predetermined time to determine whether another one of said nodes is outputting the synchronization signal or other data, and, if another one of said nodes is not outputting the synchronization signal or other data, said respective node outputs the synchronization signal; and
    said respective hode wishing to synchronize with one or more others of said nodes outputting further data which identifies said respective node in a time slot assigned to said respective node after outputting the synchronization signal or receiving the synchronization signal from another one of said nodes; and
    said respective node wishing to synchronize with one or more of said nodes defining a chronological position of time slots assigned to it as a function of the synchronization signal which is output by said respective node or received by said respective node from another one of said nodes.

4. The network according to claim 1, wherein the synchronization signal is output in a specific time slot of a time slot cycle used.

5. The network according to claim 4, wherein the specific time slot is a global time slot in which all of said nodes are allowed to output specific signals and specific data.

6. The network according to claim 1, wherein all of said nodes output the synchronization signal.

7. A synchronous network, comprising:
    nodes transmitting data to one another in a predefined sequence for a predefined duration, a plurality of said nodes outputting a synchronization signal defining a reference time for a synchronization of said nodes, said synchronization signal having a duration which is longer than a maximum signal transit time occurring inside the network, wherein a respective node of said nodes wishing to synchronize with one or more others of said nodes initially observes for a predetermined time to determine whether another one of said nodes is outputting the synchronization signal or other data, and, if another one of said nodes is not outputting the synchronization signal or other data, said respective node outputs the synchronization signal;
    said respective node wishing to synchronize with one or more others of said nodes outputting further data which identifies said respective node in a time slot assigned to said respective node after outputting the synchronization signal or receiving the synchronization signal from another one of said nodes; and
    said respective node wishing to synchronize with one or more others of said nodes defining a chronological position of time slots assigned to it as a function of the synchronization signal which is output by said respective node or received by said respective node from another one of said nodes and as a function of received data which others of said nodes have output in their assigned time slots, in order to identify itself to others of said nodes.

8. A synchronous network, comprising:
    nodes transmitting data to one another in a predefined sequence for a predefined duration, a plurality of said nodes outputting a synchronization signal defining a reference time for a synchronization of said nodes, said synchronization signal having a duration which is longer than a maximum signal transit time occurring inside the network, wherein a respective node of said nodes wishing to synchronize with one or more others of said nodes initially observes for a predetermined time to determine whether another one of said nodes is outputting the synchronization signal or other data, and, if another one of said nodes is not outputting the synchronization signal or other data, said respective node outputs the synchronization signal;

said respective node wishing to synchronize with one or more others of said nodes outputting further data which identifies said respective node in a time slot assigned to said respective node after outputting the synchronization signal or receiving the synchronization signal from another one of said nodes; and said respective node wishing to synchronize with one or more others of said nodes defining a chronological position of time slots assigned to it as a function of received data which others of said nodes have output in their assigned time slots, in order to identify itself to others of said nodes.

* * * * *